Dec. 12, 1933.  W. TESMER  1,939,581
MACHINE FOR MAKING SPIRAL PIPE
Filed April 24, 1931  3 Sheets-Sheet 3
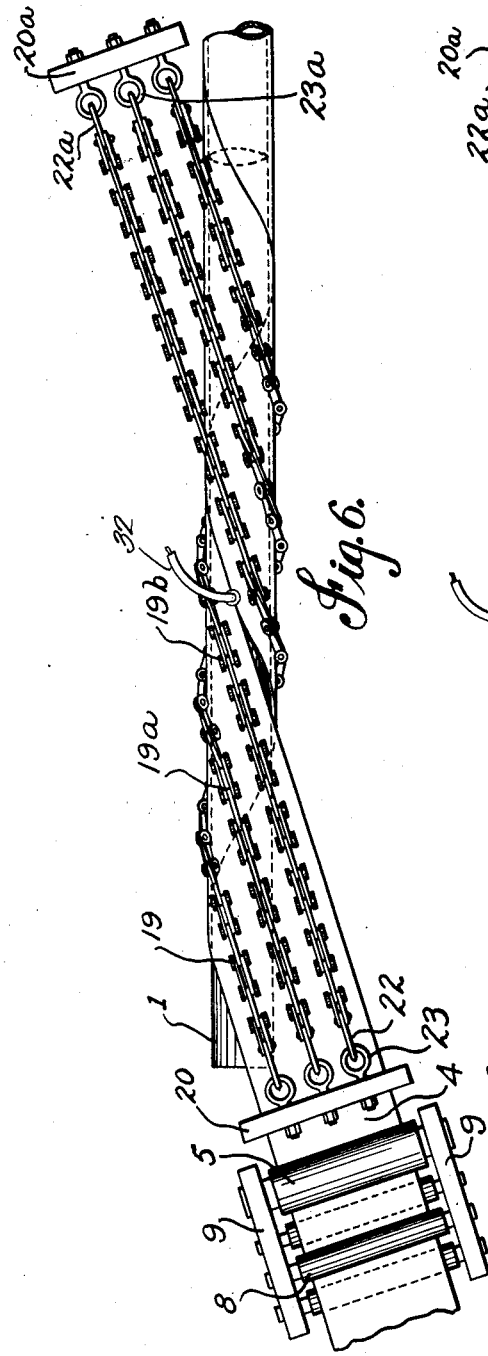
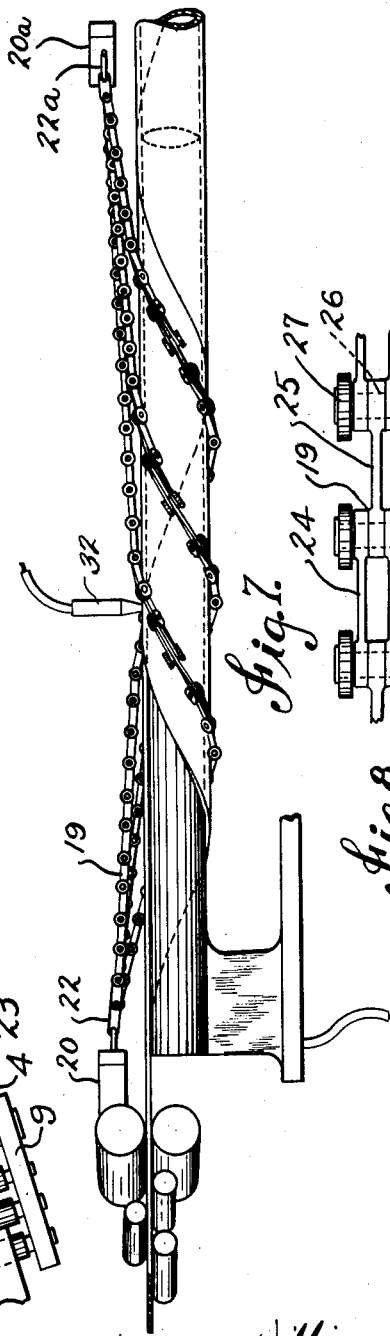
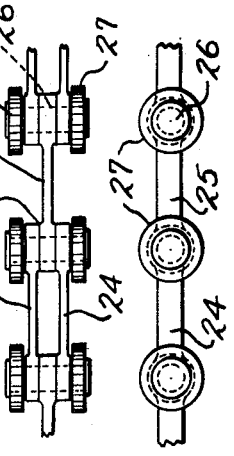
INVENTOR.
William Tesmer
BY Allen & Allen
ATTORNEYS.

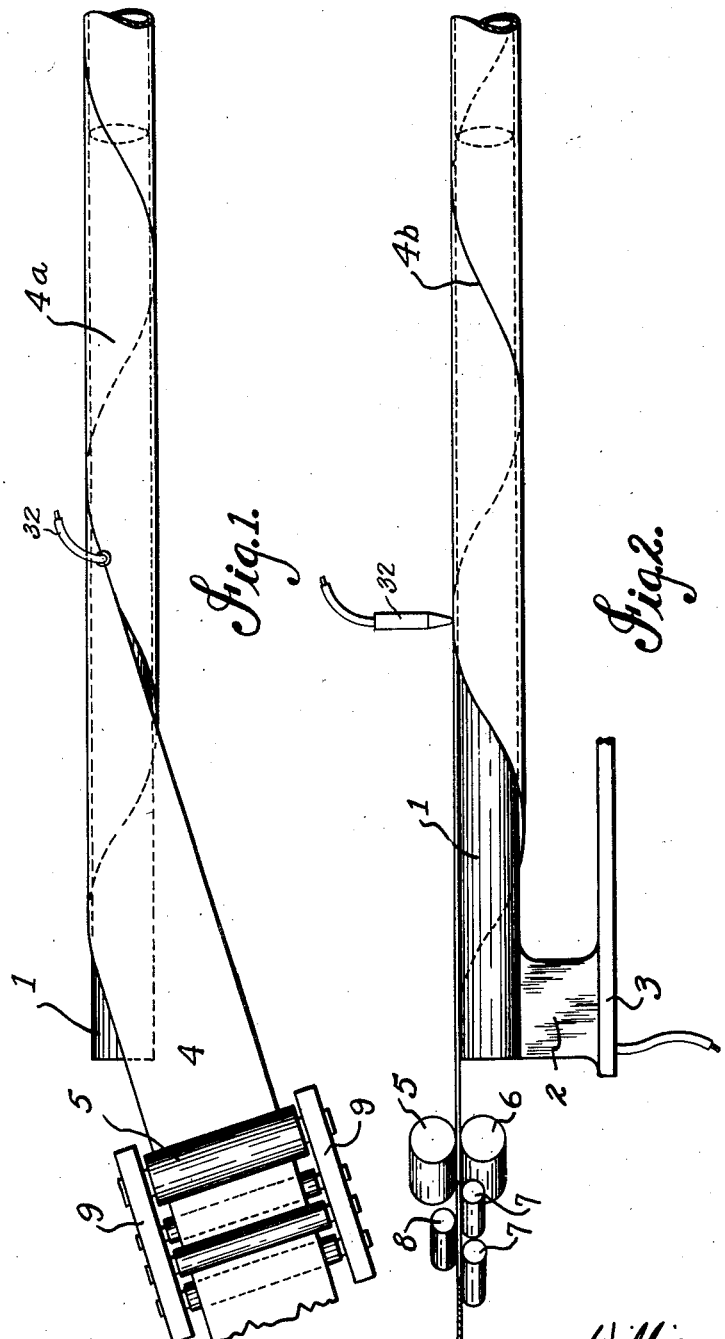

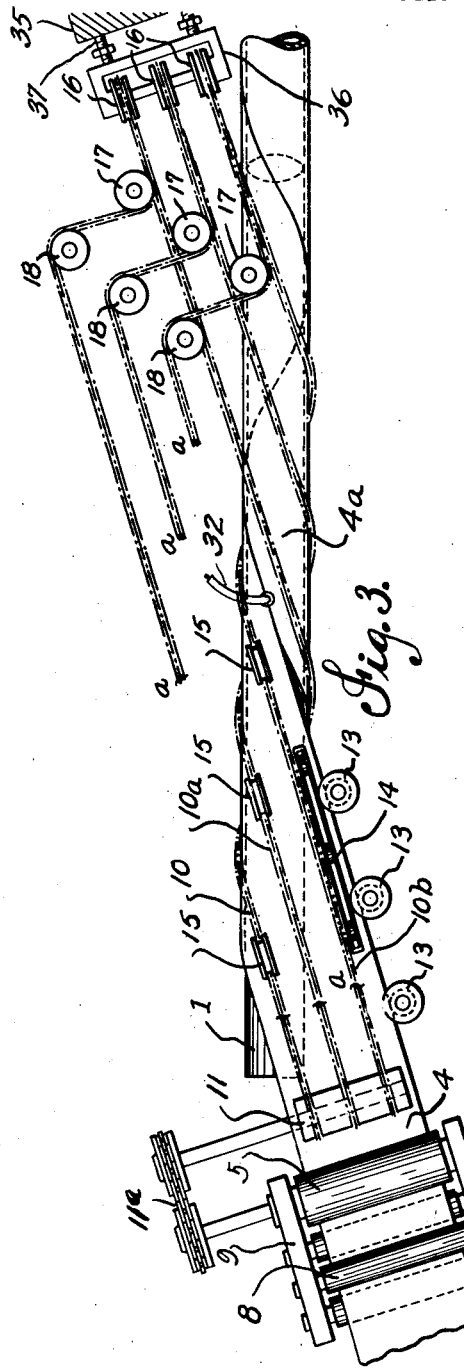
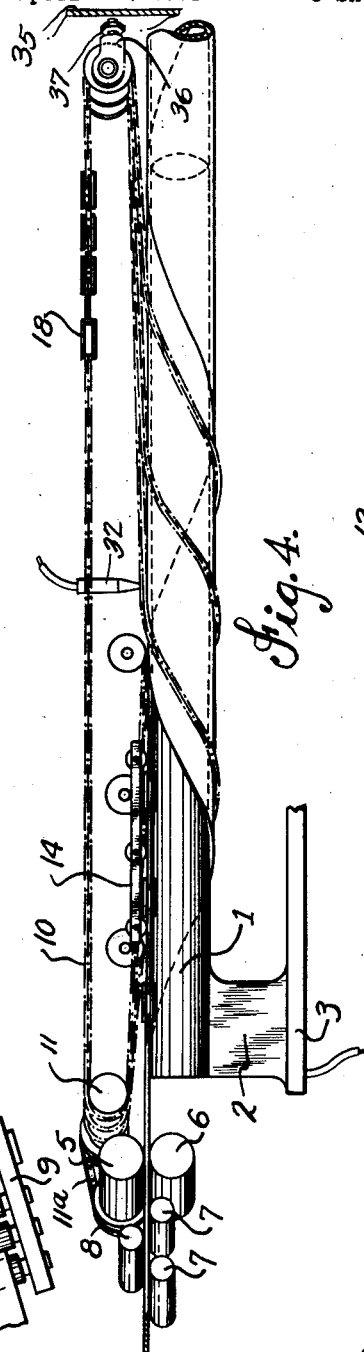
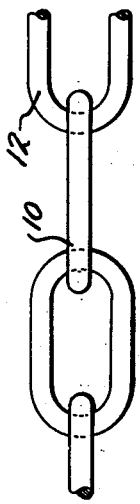

Patented Dec. 12, 1933

1,939,581

UNITED STATES PATENT OFFICE 1,939,581

MACHINE FOR MAKING SPIRAL PIPE

William Tesmer, Middletown, Ohio, assignor to The American Rolling Mill Company, Middletown, Ohio, a corporation of Ohio Application April 24, 1931. Serial No. 532,601

8 Claims. (Cl. 113—35)

My invention relates to the art of making spiral pipe, so called, but more properly helical pipe, formed by winding a metal sheet into a continuous helix and joining the meeting edges of adjacent turns to produce a continuous cylindrical shape. In order that my invention may be fully understood, it may be said that in the past there have been four main proposals in forming machines and methods. In one of these a rotating mandrel is provided, to one end of which the end of a strip of metal is attached. The strip extends at an angle to the mandrel, and as the mandrel rotates the strip is wound thereon as a closed helix. The contiguous edges are then joined. This process has the disadvantage of being discontinuous, inasmuch as the pipe may be made only in relatively short lengths.

In the second method, forming is accomplished by pushing a strip diagonally into a cylinder which has a slot for the admission of the strip. As the pipe is formed within the cylinder, it is advanced by the angular contact between the cam-like edge of the preceding turns of the helix. A hole in the cylinder wall may expose the seam for welding. The diameter of the pipe is predetermined by the bore of the cylinder, and while the method has the advantage of being continuous, a new and relatively very expensive former must be provided for each new diameter of pipe desired.

A third method is a free forming and continuous process, and the machine may be set to any standard or odd diameter within its range. No sizer, either inside or outside the pipe is required. The strip, positively fed by pinch rolls, is forced diagonally over a "knee roll", and thence through a curved path to a "buttress roll" which diverts it into a helical path. The knee roll is fixed as to position, while the buttress roll is movable towards or away therefrom so that the curvature and diameter may be increased or decreased at will. This method may be referred to as a "two-point roll-forming" method, and though it has the combined advantages of simplicity, flexibility and continuity, it has the inherent fault of irregular forming.

In the fourth, or "three-point roll-forming" method, the disadvantages of the third are corrected. The rolls in this method are set in triangular formation, two above and one below the strip. The center roll is the "knee" as before, and the "buttress" roll is in the same relative position, but not movable. A "heel" roll is placed opposite the buttress roll and about the same distance from the knee, on the entrance side of the machine, as the buttress roll is on the other. Diameter control is gained by adjusting the center or knee roll in or out between the heel and buttress rolls. This method has all of the good qualities of the two point method, with the added advantage of true forming.

A primary object of my invention is the provision of a new forming method and apparatus, differing from the methods and machines hereinabove indicated, and which has certain specific advantages.

Another object of my invention is the control or elimination of frictional difficulties in the formation of spiral pipe.

Another object of my invention in one of its aspects is to provide, in a continuous forming machine, forming means which travel with the strip.

Still another object of my invention is a simplification of mechanism and method in the forming of strip metal into a helical shape to the end of delivering perfectly formed pipe more rapidly.

These and other objects of my invention which will be set forth hereinafter or will be apparent to one skilled in the art upon reading these specifications, I accomplish by that series of process steps and by that certain construction and arrangement of parts of which I shall now describe a preferred embodiment and a modification thereof. Reference is made to the drawings forming part of these specifications, wherein:

Fig. 1 is a plan view of a mandrel and a strip feeding device, showing the manner of formation of the strip about the mandrel.

Fig. 2 is an elevation thereof.

Fig. 3 is a plan view of the elements of my forming machine showing the disposition and effect of the continuous girdle.

Fig. 4 is an elevation thereof.

Fig. 5 is a detail of a chain which may be used in the machine of Figs. 3 and 4.

Fig. 6 is a plan view of a machine employing a stationary girdle.

Fig. 7 is an elevation thereof.

Figs. 8 and 9 are views of a type of chain advantageous for use in the machine of Figs. 6 and 7.

In the practice of my invention I provide a mandrel about which the sheet or strip is formed. This mandrel is, however, stationary and non-rotatable. It is the only part of my machine which need be changed for different diameters of pipe, the other parts of my machine being capable of appropriate adjustments, as will hereinafter be pointed out. The strip is forced or pushed at an angle to this mandrel, and is formed thereabout. The formed pipe or helix not only rotates with respect to the mandrel but also moves longitudinally along it, and comes off the end of the mandrel in a continuous length. The forming is accomplished by a girdle or flexible member which is disposed helically about the mandrel, and in one embodiment moves with the strip. The strip passes between the girdle and the mandrel, and the girdle directs and wraps the strip about the mandrel, to which end the girdle is appropriately tensioned.

Hitherto in those forming machines and methods which employ stationary members about or within which the strip is forced, great difficulty has been experienced with a frictional binding of the strip. Even in those types having rotating rolls or cylinders some frictional troubles have been encountered since the strip or formed helix has paths of movement the resultant of which is at an angle to the movement of the forming devices. In my device the tension of the girdle tends to wrap the strip tightly about the mandrel; and this tendency is increased in that embodiment of the machine in which the girdle travels with the strip, by the pull of the girdle on the strip. Against this, however, there is the strong tendency of the strip as it is forced into the embrace of the girdle, to expand the same. Thus, although the girdle and mandrel acting together insure an extremely accurate forming of the helix, yet the helix is formed with an internal diameter slightly larger than the outside diameter of the mandrel, so that there is substantially no frictional binding of the pipe on the mandrel.

It will be understood that, while adequate for commercial use and perhaps in some respects to be preferred, the stationary and non-rotatable character of my mandrel is not a limitation upon my invention. I may make my mandrel rotatable if I desire, and/or equip it with whatever anti-friction means may be considered desirable. Since in a rotating mandrel there will be no one spot continuously positioned beneath the welding point, it will be possible to position a copper sleeve over part or all of the mandrel and to water cool part or all of the surface thereof, instead of the construction hereinafter described.

With this explanation, the constructional features of my machine will now be understandable. In the drawings, in which these are illustrated, I have omitted a number of structural or frame members, supports, power transmitting mechanisms and the like, not necessary to an understanding of my invention, the essentials of which are shown diagrammatically.

I have shown at 1 a mandrel which is a cylindrical bar of metal, supported at one of its ends in any desired way upon the frame or base of my device, as by means of an integral web 2 fastened to a supplementary support or base 3. Other ways of mounting the mandrel may of course be employed, the essential feature being that one end thereof be left free. The sheet 4 is fed to the mandrel diagonally. This is preferably accomplished by driven pinch rolls 5 and 6 journaled in frame members 9. These frame members may also support, if desired, a plurality of leveling rolls 7 and 8. The supplementary frame members 9 are conveniently mounted upon a swiveled supplementary base or other structure, whereby the angularity thereof with respect to the axis of the mandrel 1 may be varied so as to produce, at will, pipe in which the helical convolutions have a steep or gentle pitch. When the feeding mechanism, such as the pinch rolls 5 and 6, is so mounted, it is unnecessary to move the mandrel 1 in changing the pitch of the pipe. For different diameters of pipe different mandrels will be needed; but these will be relatively cheap to produce and easy to install. Of course sleeves of various sizes may be employed with a single mandrel which is substantially the same in diameter as the inside diameter of the smallest pipe which it is desired to produce. Separate mandrels will, however, usually be found preferable.

The strip 4 is wound about the mandrel 1 in convolutions indicated at 4a, so as to make a closed cylinder or pipe. The edges of the convolutions may be lapped or butted, and joined in any desired way. Probably the most desirable commercial operation comprises the butting of the edges of the helical turns and the continuous welding of said edges together by an electric arc device shown generally at 32. Since my invention is primarily addressed to the method of forming the strip into the desired spiral or helix, various types of joints and various forms of welding or other devices may be used. In practice, I prefer to mount an electric welding head with suitable magnetic control means upon the frame of my device in such a way as to locate the welding point in the path of continuous travel of the butted edges of the helical turns 4a. Since the completed pipe moves longitudinally as well as in a rotary manner with respect to the mandrel 1, it will be understood that a fixed point may be chosen directly in the path of the moving edges of the strip. Preferably this point is located at or near the first point of complete formation of the pipe. Beneath this point I ordinarily cut away a portion of my mandrel and locate therein a water-cooled backing member for the weld. This member is advantageously made of copper. The terminals, of a source of electric power, are, of course, connected one to the weld rod or welding head, and the other to the strip 4, through any appropriate contacting means, such as the mandrel 1, or rollers, or the like, directly against the strip. It will also be understood that in the commercial manufacture of pipe individual strips of metal are joined by a suitable welding operation into what becomes to all intents, an endless length as respects my forming device; that the formed pipe travels longitudinally off the end of my mandrel 1, having a rotary motion at the same time, and that suitable lengths thereof are cut off for use as required. All of these features have not been illustrated in my drawings since they are known to the art, and are applicable to my device in substantially the same way in which they have been applied to other devices, excepting where otherwise indicated.

In order to effect the true formation of the helical turns 4a, I employ, in connection with my mandrel 1, means forming an encircling girdle about the wound strip, which girdle in one embodiment of my invention travels in a helical path with the strip. I have shown in Fig. 3 a plurality of chain members 10, 10a and 10b, which are indicated as traveling with the strip 4 in a helical path about the mandrel 1. These chains, at the entrance end of my machine, pass over a grooved roll 11 or series of sheaves which may be driven by the upper pinch roller 5 through its chain 11a, and also over another grooved roll or series of sheaves 16 at the exit end of my machine. These sheaves 16 are adjustably fastened to an outside support 35 by means of the yoke 36 and turn-buckle 37. Since, by reason of the helical disposition of these chains about the mandrel, while the roll 11 and sheaves 16 may be caused to lie in the same horizontal plane, as shown in Fig. 3, yet they will be offset from each other in said plane. In order that the chains may be returned in straight lines perpendicular to the axis of the sheaves and rolls, this offset relationship is compensated for by a series of diverting sheaves 17 and 18, which respectively carry the chains to new positions of return. The chains may in this instance be ordinary chains comprising links 12, as shown in Fig. 5, or they may take other formations, as desired. Since they travel with the strip and the convolutions 4a thereof, the problem of friction between these chains and the strip is substantially non-existent. Other formations of chain may therefore be employed; but it is not necessary in this embodiment of my invention to make provision for the non-frictional sliding of the chains over the strip. In Fig. 3 the returning portions of the chains 10, 10a and 10b are broken away along the lines "a" in order to make a clearer showing.

Provision will also be made for tensioning the chains, and to this end a number of expedients may be employed. I prefer to mount the shaft which carries the shaft 16 upon a yoke 36, and to provide a number of turn-buckles 37 adjustably connecting the yoke to the support 35. In some cases it may be beneficial to replace the turn-buckles with springs. Since in this embodiment of my invention I provide endless chains and desire to have them move with the strip, I prefer to drive the sheaves or roller at the entrance as by the chain 11a or at the exit end of my machine, or both, by any suitable type of power connection. The chains themselves may be taken up by a relative movement of any of the sheaves. The number of chains may be varied to suit individual requirements. I have shown three; but more may be used if desired, and in some instances less. I have shown grooved side engaging rollers 13 guiding the edges of my sheet as it is fed forward, and a device indicated at 14 which comprises a frame and small rolls to prevent the buckling of the strip as it is fed forward. The chains may be guided in their movement with the strip by means of small grooved rolls indicated at 15, located in various places about the periphery of the formed and forming pipe to prevent sidewise displacement of the chains. The strip is fed into my machine as described, and by the cooperative action of the girdle and the mandrel, it is very accurately formed into a helical cylindrical structure. The edges are joined as hereinabove described, and the pipe is complete. The operation of my machine is quite rapid without loss of accuracy, and consequently it is possible to form a cylindrical structure much more rapidly than it can be welded together by ordinary welding equipment. Intermittent welding means may therefore be employed to tack the pipe at intervals, and lengths of the pipe may then be carried to separate welding machines. Two or more of such welding machines may be fed from a single one of my forming devices.

In the modifications of Figs. 6 and 7, I have employed a girdle which does not travel with the strip. This girdle likewise is wrapped in a helical fashion about the strip and about the mandrel. The chains in this instance are indicated at 19, 19a, and 19b, and at either end they have links 22 and 22a, which engage I-bolts 23 and 23a, by which they are fastened to tensioning bars 20 and 20a. One of these bars may be mounted directly upon the frame of my device, and the other provided with a sliding mounting and tensioning means, as will be well understood. Since in this embodiment the chains are stationary with respect to the strip, it is necessary to provide non-frictional means to facilitate the sliding of the strip with respect to the chains. Consequently I prefer to form my chains 19, etc. of links and intermediate links, 24 and 25, engaged by shafts 26 upon which small rollers 27 are mounted. The rollers engage the strip and enable it to slide easily with respect to the chains. Since these rollers are located upon both sides of the chain links, a broader bearing surface is presented than in the case of chains such as those shown in Fig. 5. Other types of chains may, however, be employed.

Having thus described my invention, what I claim as new and desire to secure by Letters Patent, is:—

1. In a spiral pipe-forming device, a mandrel, a girdle comprising endless flexible members helically disposed thereabout and extending in the same general direction as said mandrel, means for guiding said flexible members, means for driving said flexible members, and means for forcing a strip at an angle to said mandrel and into the interspace between said mandrel and said flexible members so as to follow substantially the helical path of said members.

2. In a spiral pipe-forming device, a mandrel, a series of endless chains helically disposed about said mandrel as a girdle in a portion of their length, the remainder of their length being returned away from said mandrel, said chains extending in the same general direction as said mandrel, means for aligning said chains, means for driving said chains, and means for forcing a strip at an angle to said mandrel and into the interspace between said mandrel and said chains so that said strip will substantially follow the helical convolutions of said flexible members.

3. In a spiral pipe-forming device, a mandrel, a series of endless chains helically disposed about said mandrel as a girdle in a portion of their length, the remainder of their length being returned away from said mandrel, said chains extending in same general direction as said mandrel, means for aligning said chains, means for driving said chains, and means for forcing a strip at an angle to said mandrel and into the interspace between said mandrel and said chains so that said strip will substantially follow the helical convolutions of said flexible members, and means for guiding said strip as it is being fed, whereby said helical turns may be formed with contiguous edges.

4. In a spiral pipe-forming device, a mandrel, a series of endless chains helically disposed about said mandrel as a girdle in a portion of their length, the remainder of their length being returned away from said mandrel, said chains extending in the same general direction as said mandrel, means for aligning said chains, means for driving said chains, and means for forcing a strip at an angle to said mandrel and into the interspace between said mandrel and said chains so that said strip will substantially follow the helical convolutions of said chains, means for guiding said strip as it is being fed, whereby said helical turns may be formed with contiguous edges, and means for joining said contiguous edges to produce a continuous cylindrical pipe.

5. In a spiral pipe-forming device, a mandrel, a series of endless chains helically disposed about said mandrel as a girdle in a portion of their length, the remainder of their length being returned away from said mandrel, said chains extending in the same general direction as said mandrel, means for aligning said chains, means for driving said chains, and means for forcing a strip at an angle to said mandrel and into the interspace between said mandrel and said chains so that said strip will substantially follow the helical convolutions of said chains, means for guiding said strip as it is being fed, whereby said helical turns may be formed with contiguous edges, means for joining said contiguous edges to produce a continuous cylindrical pipe comprising a welding means, and means for guiding said chains in said helical convolutions.

6. In a spiral pipe-forming device, a mandrel, at least one endless girdle member helically disposed about said mandrel in one portion of its length, the remainder of said girdle member being returned away from said mandrel, sheaves at the effective ends of said girdle member, and means intermediate said sheaves for changing the direction of motion of said girdle member in said returning portion.

7. In a spiral pipe-forming device, a mandrel, at least one endless girdle member helically disposed about said mandrel in one portion of its length, the remainder of said girdle member being returned away from said mandrel, sheaves at the effective ends of said girdle member, and means intermediate said sheaves for changing the direction of motion of said girdle member in said returning portion, said means comprising a plurality of sheaves positioned to effect an off-set in the direction of motion of said girdle member.

8. In a spiral pipe-forming device, a mandrel, at least one endless girdle member helically disposed about said mandrel in one portion of its length, the remainder of said girdle member being returned away from said mandrel, sheaves at the effective ends of said girdle member, and means intermediate said sheaves for changing the direction of motion of said girdle member in said returning portion, said means comprising a plurality of sheaves positioned to effect an offset in the direction of motion of said girdle member, means for driving at least one of said sheaves, and means for tensioning said sheaves.

WILLIAM TESMER.